United States Patent
Takahashi et al.

(10) Patent No.: US 11,686,604 B2
(45) Date of Patent: Jun. 27, 2023

(54) ULTRASONIC FLOW METER HAVING ONE OR MORE INTEGRALLY MOLDED PARTITION PLATES DIVIDING THE MEASUREMENT PATH AND HAVING THINNER UPSTREAM AND DOWNSTREAM EDGES

(71) Applicant: Panasonic Intellectual Property Management Co., Ltd., Osaka (JP)

(72) Inventors: Yukihide Takahashi, Nara (JP); Hiroshi Nakai, Osaka (JP); Kenji Yasuda, Kyoto (JP); Takashi Kayaba, Kyoto (JP); Yuki Anan, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 324 days.

(21) Appl. No.: 17/256,452

(22) PCT Filed: Jul. 12, 2019

(86) PCT No.: PCT/JP2019/027783
§ 371 (c)(1),
(2) Date: Dec. 28, 2020

(87) PCT Pub. No.: WO2020/031621
PCT Pub. Date: Feb. 13, 2020

(65) Prior Publication Data
US 2021/0270649 A1 Sep. 2, 2021

(30) Foreign Application Priority Data
Aug. 8, 2018 (JP) .............................. JP2018-148964

(51) Int. Cl.
*G01F 1/66* (2022.01)
*G01F 1/667* (2022.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS

| 5,383,369 A * | 1/1995 | Khuri-Yakub | G01P 5/245 73/571 |
| 8,925,390 B2 * | 1/2015 | Fujii | G01F 1/667 73/861.18 |

(Continued)

FOREIGN PATENT DOCUMENTS

| EP | 1 612 520 | 1/2006 |
| JP | 2004-170384 | 6/2004 |

(Continued)

OTHER PUBLICATIONS

Extended European Search Report dated Aug. 11, 2021 in related European Patent Application No. 19847012.2.

(Continued)

*Primary Examiner* — Harshad R Patel
(74) *Attorney, Agent, or Firm* — Wenderoth, Lind & Ponack, L.L.P.

(57) ABSTRACT

An ultrasonic flow meter includes measurement flow path where a cross section of a flow path through which a fluid to be measured flows is rectangular, one or more partition plates that divide measurement flow path into a plurality of layered flow paths, and a pair of ultrasonic sensors that are disposed upstream and downstream on the layered flow paths and are capable of transmitting and receiving an ultrasonic signal. In addition, the ultrasonic flow meter includes a flow rate measuring unit that detects a flow rate of the fluid to be measured based on a propagation time, the propagation time being a time period from when one of the (Continued)

ultrasonic sensors transmits the ultrasonic signal to cause the ultrasonic signal to propagate through the fluid to be measured until when an other one of the ultrasonic sensors receives the ultrasonic signal.

15 Claims, 4 Drawing Sheets

(56) References Cited

U.S. PATENT DOCUMENTS

| 2006/0156828 | A1  | 7/2006 | Konzelmann et al. | |
|---|---|---|---|---|
| 2007/0193367 | A1* | 8/2007 | Umekage | G01F 1/662 |
| | | | | 73/861.27 |
| 2011/0167926 | A1* | 7/2011 | Gotou | G01F 1/662 |
| | | | | 73/861.18 |
| 2012/0266691 | A1* | 10/2012 | Satou | G01F 1/662 |
| | | | | 73/861.28 |
| 2015/0204705 | A1* | 7/2015 | Forster | G01F 1/667 |
| | | | | 73/861.28 |

FOREIGN PATENT DOCUMENTS

| JP | 2004-316685 | 11/2004 |
|---|---|---|
| JP | 2014-215060 | 11/2014 |
| RU | 2422777 | 6/2011 |
| WO | 2012/164859 | 12/2012 |

OTHER PUBLICATIONS

Communication pursuant to Article 94(3) EPC dated Apr. 21, 2022 for the related European Patent Application No. 19847012.2.
International Search Report of PCT application No. PCT/JP2019/027783 dated Oct. 1, 2019.

* cited by examiner

ULTRASONIC FLOW METER HAVING ONE OR MORE INTEGRALLY MOLDED PARTITION PLATES DIVIDING THE MEASUREMENT PATH AND HAVING THINNER UPSTREAM AND DOWNSTREAM EDGES

CROSS-REFERENCE TO RELATED APPLICATIONS

This application is a U.S. national stage application of the PCT International Application No. PCT/JP2019/027783 filed on Jul. 12, 2019, which claims the benefit of foreign priority of Japanese patent application No. 2018-148964 filed on Aug. 8, 2018, the contents all of which are incorporated herein by reference.

TECHNICAL FIELD

The present invention relates to an ultrasonic flow meter that divides a measurement flow path into multi-layer flow paths by a partition plate to measure a flow rate.

BACKGROUND ART

Conventionally, as an ultrasonic flow meter of this type, there is an ultrasonic flow meter including, as separate components, measurement flow path 101, a plurality of partition plates 102, and entrainment flow suppressing sheet 103, as illustrated in FIG. 6. Measurement flow path 101 includes component insertion port 106, and after the plurality of partition plates 102 is inserted into measurement flow path 101 from component insertion port 106 at a predetermined angle, component insertion port 106 is covered with entrainment flow suppressing sheet 103. After that, ultrasonic sensor mounting block 104 is fixed to measurement flow path 101 by a method such as heat welding to close component insertion port 106, and a pair of ultrasonic sensors 105*a*, 105*b* are attached to ultrasonic sensor mounting block 104, so that the ultrasonic flow meter illustrated in FIG. 6 has a configuration in which a fluid to be measured does not leak. Furthermore, entrainment flow suppressing sheet 103 is provided with openings 103*a*, 103*b* for passing ultrasonic waves (see, for example, PTL 1). Note that measurement flow path 101 is provided with partition plates 102 in order to make a flow velocity distribution of a fluid flowing through measurement flow path 101 uniform.

CITATION LIST

Patent Literature

PTL 1: Unexamined Japanese Patent Publication No. 2014-215060

SUMMARY OF THE INVENTION

However, the conventional ultrasonic flow meter described in PTL 1 has a problem that the number of components is large and costs are high.

Furthermore, partition plate 102 is molded by a metal plate being punched with a mold, and a state differs between a front surface and a back surface because burrs and warpage occur during molding. Therefore, in order to improve the measurement accuracy, it is necessary to put the front and back surfaces in order, and to devise partition plate 102 to identify the front and back surfaces.

In the present disclosure, integrally molding the measurement flow path and the partition plates reduces the costs as compared with a conventional configuration, and a draft of a mold generated in each of the partition plates accompanied by the integral molding of the measurement flow path and the partition plates suppresses a problem that a flow of the fluid to be measured varies, which is caused by deviation of traveling directions of sound waves reflected by the partition plates or separation of the fluid at end portions of the partition plates. In addition, there is provided an ultrasonic flow meter capable of improving variation in measurement due to disturbance of a received waveform caused by this problem.

An ultrasonic flow meter in the present disclosure includes a measurement flow path where a cross section of a flow path through which a fluid to be measured flows is rectangular, one or more partition plates that divide the measurement flow path into a plurality of layered flow paths, and a pair of ultrasonic sensors that are disposed upstream and downstream on the layered flow paths and are capable of transmitting and receiving an ultrasonic signal. In addition, the ultrasonic flow meter in the present disclosure includes a flow rate measuring unit that detects a flow rate of the fluid to be measured based on a propagation time, the propagation time being a time period from when one of the ultrasonic sensors transmits the ultrasonic signal to cause the ultrasonic signal to propagate through the fluid to be measured until when an other one of the ultrasonic sensors receives the ultrasonic signal. Furthermore, the measurement flow path and the one or more partition plates are integrally molded, and the one or more partition plates have a shape that is thinner from a portion having a maximum thickness toward an inlet side of the measurement flow path and an outlet side of the measurement flow path.

With this configuration, the ultrasonic flow meter of the present disclosure can improve the variation in measurement, which is caused by turbulence of the flow of the fluid to be measured due to the separation of the fluid to be measured at the end portions of the one or more partition plates, while reducing the number of components as compared with a conventional case, to reduce costs of components.

DESCRIPTION OF EMBODIMENTS

Hereinafter, exemplary embodiments will be described with reference to the drawings.

First Exemplary Embodiment

Figure 1:
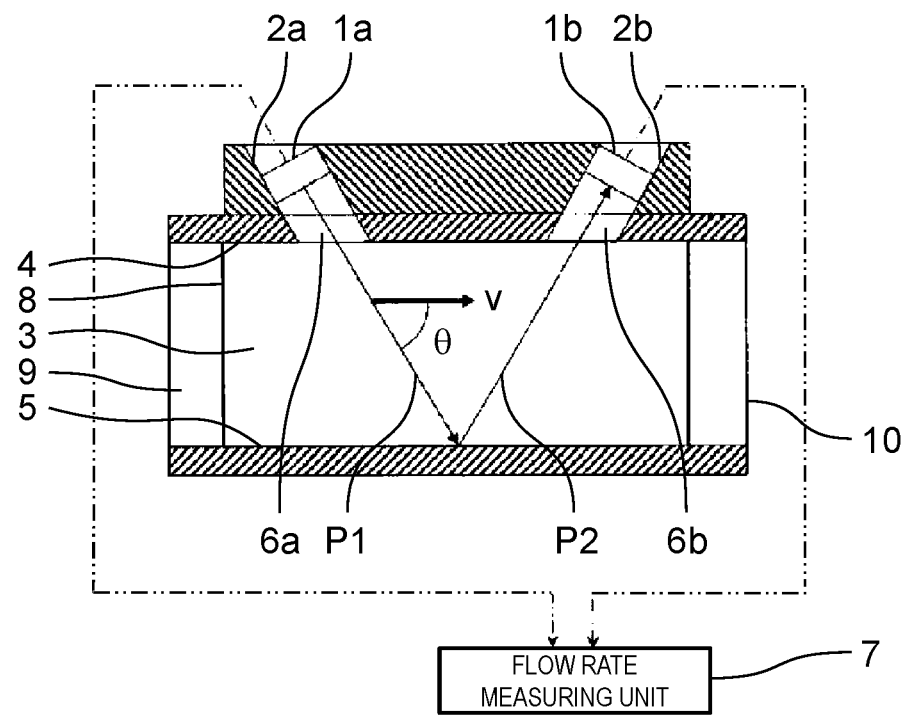
FIG. 1 is a cross-sectional view of an ultrasonic flow meter according to a first exemplary embodiment.
Figure 2:
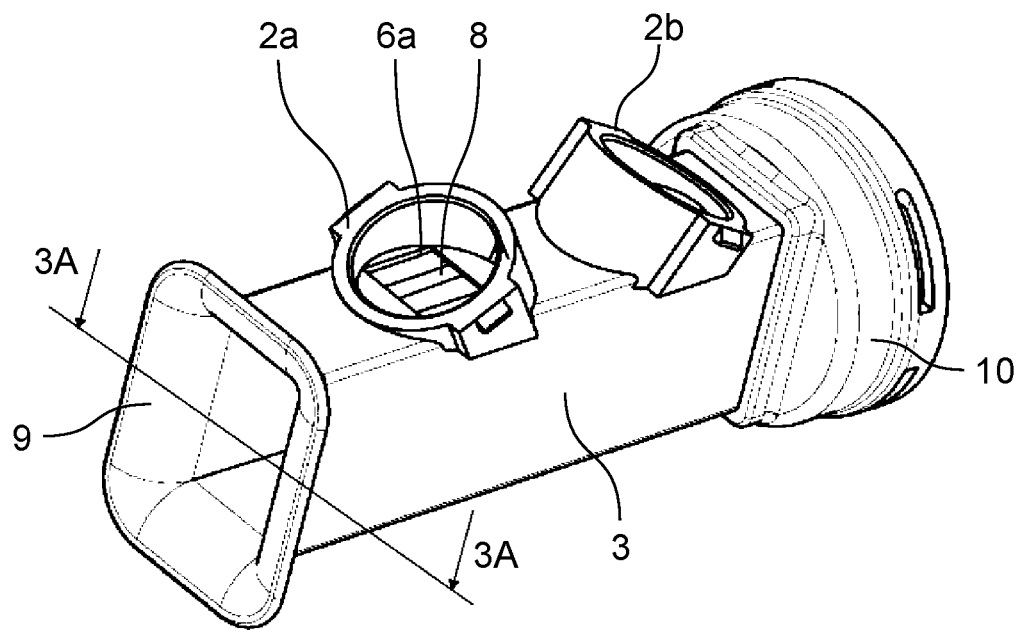
FIG. 2 is a perspective view of a measurement flow path of the ultrasonic flow meter according to the first exemplary embodiment.
Figure 3A:
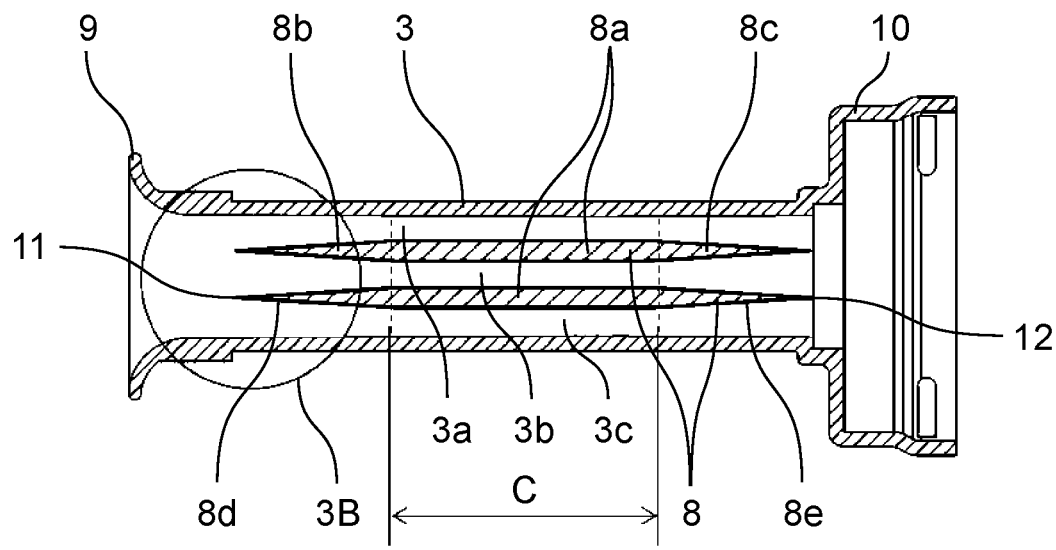
FIG. 3A is a cross-sectional view taken along line 3A-3A of FIG. 2.
Figure 3B:
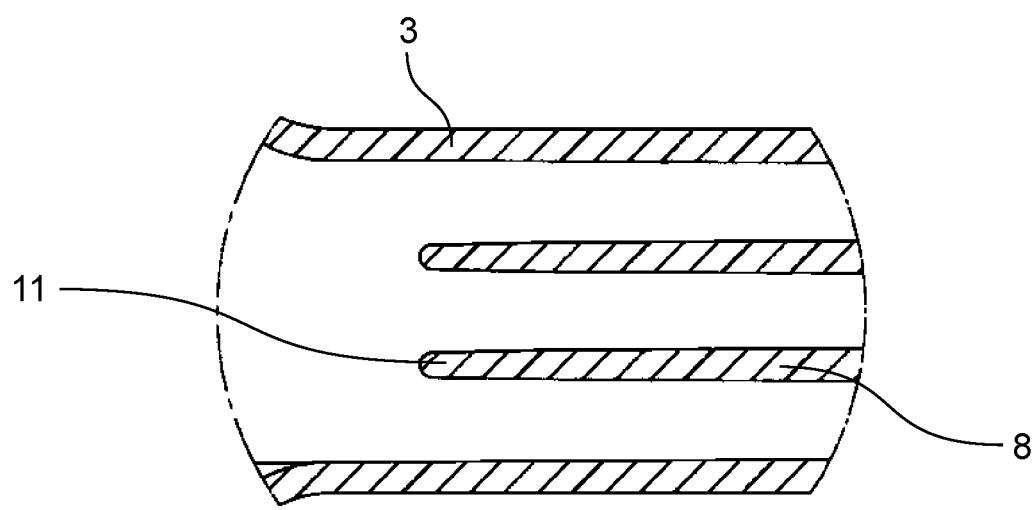
FIG. 3B is an enlarged view of part 3B of FIG. 3A.

FIG. 1 is a cross-sectional view of an ultrasonic flow meter according to a first exemplary embodiment. FIG. 2 is a perspective view of a measurement flow path of the ultrasonic flow meter according to the first exemplary embodiment. FIG. 3A is a cross-sectional view taken along line 3A-3A of FIG. 2. FIG. 3B is an enlarged view of part 3B of FIG. 3A.

As illustrated in FIGS. 1 and 3A, measurement flow path 3 for passing a fluid to be measured from measurement flow path inlet 9 to measurement flow path outlet 10 is a pipe for passing the fluid to be measured, and is divided into three layered flow paths 3a, 3b, 3c by two partition plates 8. Openings 6a, 6b through which ultrasonic waves propagate so that the ultrasonic waves are transmitted and received diagonally to measurement flow path 3 are formed on measurement flow path upper surface 4, and ultrasonic sensors 1a, 1b are fixed to mounting portions 2a, 2b so that the ultrasonic waves are reflected by measurement flow path bottom surface 5 and pass through propagation paths P1 and P2. Flow rate measuring unit 7 calculates a flow rate based on a propagation time of the ultrasonic waves between ultrasonic sensors 1a, 1b.

As illustrated in FIG. 2, measurement flow path 3, partition plates 8, and mounting portions 2a, 2b are integrally molded with resin. As a result, it is possible to reduce the number of components as compared with a conventional ultrasonic flow meter, to reduce costs.

Next, a structure of partition plate 8, which is a feature of the present application, will be described in detail with reference to FIGS. 3A and 3B.

A shape of partition plate 8 in the present exemplary embodiment is intended to improve the accuracy of flow rate measurement when measurement flow path 3 and partition plates 8 are integrally molded.

Therefore, partition plate 8 has a shape in which a portion from portion 8a having the maximum thickness toward sides of measurement flow path inlet 9 and measurement flow path outlet 10 of measurement flow path 3 is gradually thinner toward tips 11, 12 of partition plate 8.

Due to a problem of the dimensional accuracy of resin molding, partition plate 8 needs to have a certain thickness. However, the thicker end portion 8d of partition plate 8 located on a side of measurement flow path inlet 9, the more easily the fluid to be measured is separated. Therefore, a movement of the fluid to be measured in region C where the ultrasonic waves propagate in measurement flow path 3 is unstable. Therefore, in the present exemplary embodiment, sharpened portions 8b, 8c are provided in which the thickness of partition plate 8 is made thinner from portion 8a having the maximum thickness toward respective tips 11, 12 of partition plate 8, so that it is possible to suppress the separation of the fluid to be measured and stabilize the flow rate measurement.

Furthermore, partition plate 8 has a surface parallel to a flow direction of the fluid to be measured and sound radiation directions of ultrasonic sensors 1a, 1b in region C where the ultrasonic waves propagate.

That is, in order to suppress turbulence of the flow of the fluid to be measured most, it is optimal that all cross-sectional shapes of partition plate 8 are streamlined. However, in region C where the ultrasonic waves transmitted and received by ultrasonic sensors 1a, 1b propagate, the ultrasonic waves are reflected on a surface of partition plate 8. Thus, when a reflecting surface is a curved surface, reflecting directions of sound waves differ depending on where the sound waves are reflected on partition plate 8, and a finally obtained received waveform is unstable. Therefore, in region C where the ultrasonic waves propagate, partition plate 8 is formed as flat as possible and has a surface parallel to the flow direction of the fluid to be measured and the sound radiation directions of ultrasonic sensors 1a, 1b, so that the received waveform has less variation than when the surface of partition plate 8 is inclined, and more stable measurement can be performed.

Furthermore, as illustrated in FIG. 3B, tip 11 of partition plate 8 on the side of measurement flow path inlet 9 may be a curved surface. In addition, tip 12 of partition plate 8 on the side of measurement flow path outlet 10 may also be a curved surface.

When the fluid is divided by a plate-shaped rigid body, a teardrop-shaped cross-sectional shape with a rounded front edge and a thin and sharp trailing edge is said to cause the least fluid separation and have the lowest resistance. However, in a gas meter or the like in which the ultrasonic flow meter is actually used, backflow also occurs. Thus, if the trailing edge is thin and sharp, when the backflow occurs and an inflow angle of the fluid to be measured deviates from an angle of the partition plate, the fluid to be measured is separated at the trailing edge. Therefore, the flow in the region where the ultrasonic waves measured by the ultrasonic sensors propagate may be turbulent, and a difference may occur in measured values of the flow rate measurement between cases of a forward flow and the backflow.

Furthermore, if the tip of partition plate 8 is made an acute angle, a short shot may occur in which the resin does not enter the tip during molding, and shapes of the tips may be uneven, which may also cause the turbulence of the flow of the fluid to be measured. Therefore, when tips 11, 12 of partition plates 8 on both sides of measurement flow path inlet 9 and measurement flow path outlet 10 are made as the curved surfaces, more stable flow rate measurement can be performed.

Second Exemplary Embodiment

Figure 4:
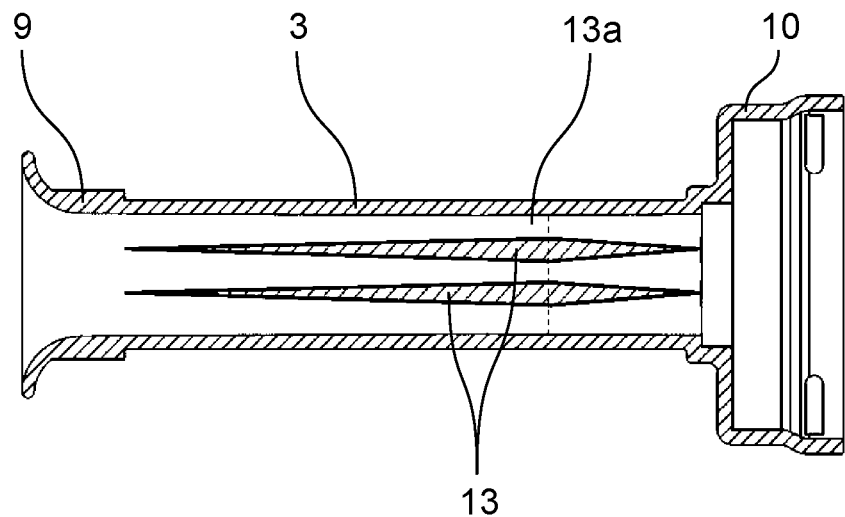
FIG. 4 is a cross-sectional view of an ultrasonic flow meter according to a second exemplary embodiment in a direction perpendicular to partition plates.

FIG. 4 is a cross-sectional view of an ultrasonic flow meter according to a second exemplary embodiment in a direction perpendicular to a partition plate. A cross-sectional view in a direction parallel to partition plates 8 is similar to that in FIG. 1.

In the ultrasonic flow meter, it is important that separation of a fluid is reduced mainly in a region measured by ultrasonic sensors 1a, 1b in a case of a forward flow. In the present exemplary embodiment, portion 13a having the maximum thickness of partition plate 13 is not a midpoint of partition plate 13 but closer to a trailing edge (side of measurement flow path outlet 10) than to a front edge (side of measurement flow path inlet 9).

With this configuration, the ultrasonic flow meter in the present exemplary embodiment can suppress the separation of the fluid in the region where the ultrasonic waves are measured in the case of the forward flow, and can perform more stable measurement.

Furthermore, if a surface of partition plate 13 has a curved surface in a measurement region (region where the ultrasonic waves propagate) of ultrasonic sensors 1a, 1b, reflection directions of sound waves differ depending on where the sound waves are reflected on partition plate 13, and a received waveform is unstable. Thus, the measurement region of ultrasonic sensors 1a, 1b may have a flat surface while a curved surface is minimized.

Third Exemplary Embodiment

Figure 5:
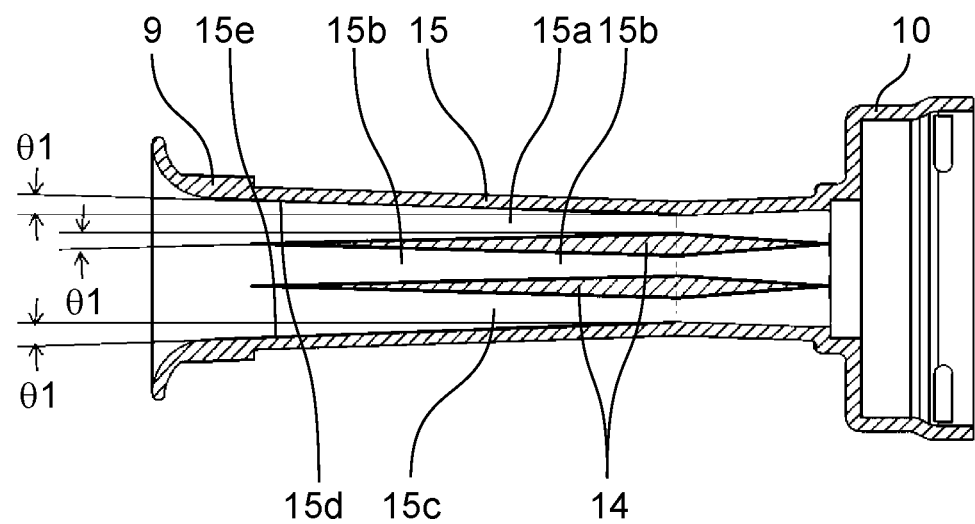
FIG. 5 is a cross-sectional view of an ultrasonic flow meter according to a third exemplary embodiment in a direction perpendicular to partition plates.
Figure 6:
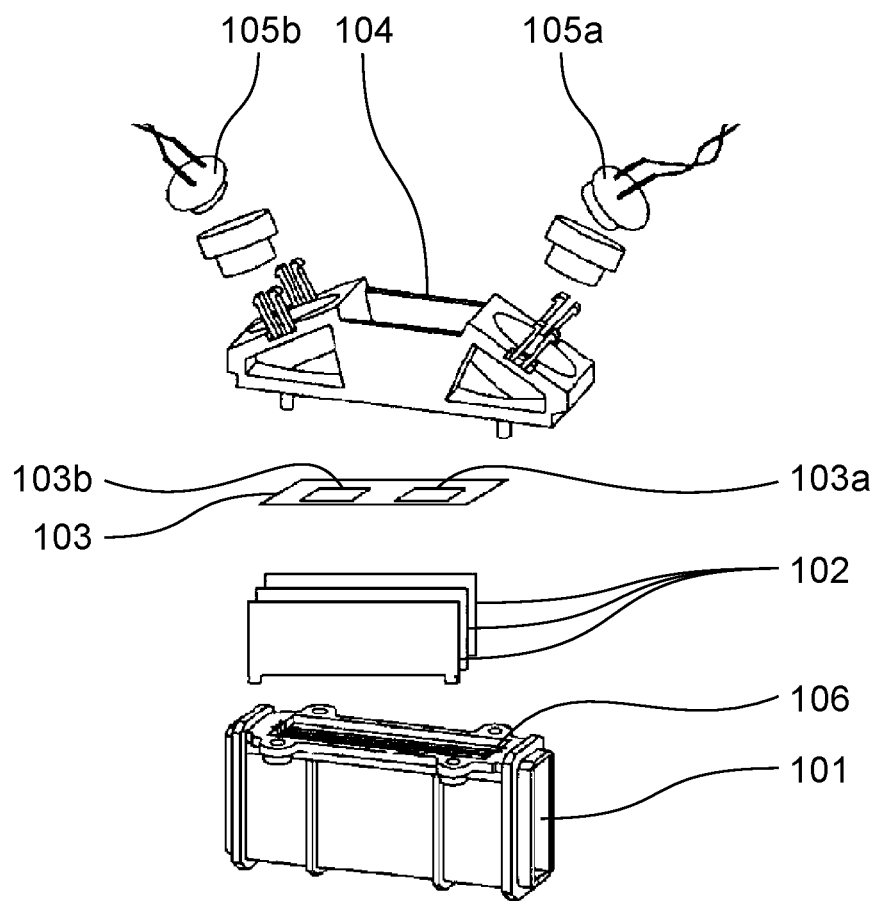
FIG. 6 is an exploded perspective view of a conventional ultrasonic flow meter.

FIG. 5 is a cross-sectional view of an ultrasonic flow meter according to a third exemplary embodiment in a direction perpendicular to a partition plate. A cross-sectional view in a direction parallel to partition plates 14 is similar to that in FIG. 1.

In the present exemplary embodiment, among inner walls of measurement flow path 15, inner walls 15d, 15e parallel to partition plates 14 are provided with gradients symmetrical with gradients of partition plates 14 facing inner walls 15d, 15e. That is, in order to make shapes of three layered flow paths 15a, 15b, 15c formed by measurement flow path 15 being divided by two partition plates 14 into the same shape, inner walls 15d, 15e of the flow path are also provided with the same gradient as draft θ1 provided on partition plates 14.

If shapes of regions where a fluid to be measured flows in the layered flow paths are different, a flow velocity distribution and a pressure loss change for each layer, and a flow velocity ratio for each layer is far from a uniform ratio. In this case, if the temperature or a gas type changes, the flow velocity ratio also changes, which makes it difficult to perform correction with software and causes an error in a measured flow rate. On the other hand, according to the present exemplary embodiment, since the shapes of layered flow paths 15a, 15b, 15c are the same, the flow velocity ratio for each layer is uniform, and more stable flow rate measurement can be performed.

As described above, according to the present disclosure, integrally molding the measurement flow path and the partition plates reduces the costs as compared with a conventional configuration, and the draft of the mold generated in each of the partition plates accompanied by the integral molding of the measurement flow path and the partition plates is used. With this configuration, it is possible to improve variation in measurement due to disturbance of the received waveform, which is caused by deviation of traveling directions of the sound waves reflected by the partition plates, occurrence of variation of the flow of the fluid to be measured due to the separation of the fluid at the end portions of the partition plates, or the like.

Note that, in the drawings used for the description of the above-described exemplary embodiments, the inclination of the partition plates is drawn large to make the description easy to understand, but the actual draft of the mold is about 0.3°. Furthermore, although the description has been made assuming that the number of partition plates is two, it goes without saying that one or three or more partition plates may be used.

As described above, an ultrasonic flow meter in a first disclosure includes a measurement flow path where a cross section of a flow path through which a fluid to be measured flows is rectangular, one or more partition plates that divide the measurement flow path into a plurality of layered flow paths, and a pair of ultrasonic sensors that are disposed upstream and downstream on the layered flow paths and are capable of transmitting and receiving an ultrasonic signal. In addition, the ultrasonic flow meter in the present disclosure includes a flow rate measuring unit that detects a flow rate of the fluid to be measured based on a propagation time, the propagation time being a time period from when one of the ultrasonic sensors transmits the ultrasonic signal to cause the ultrasonic signal to propagate through the fluid to be measured until when an other one of the ultrasonic sensors receives the ultrasonic signal. Furthermore, the measurement flow path and the one or more partition plates are integrally molded, and the one or more partition plates have a shape that is thinner from a portion having a maximum thickness toward an inlet side of the measurement flow path and an outlet side of the measurement flow path.

With this configuration, the ultrasonic flow meter in the first disclosure can improve variation in measurement, which is caused by turbulence of a flow of the fluid to be measured due to separation of the fluid to be measured at end portions of the one or more partition plates, while reducing the number of components as compared with a conventional case, to reduce costs of components.

In an ultrasonic flow meter in a second disclosure, particularly in the first disclosure, the portion having the maximum thickness may have a surface parallel to a flow direction of the fluid to be measured and sound radiation directions of the ultrasonic sensors, and include at least a part of a region where sound waves transmitted by the ultrasonic sensors propagate.

With this configuration, in the ultrasonic flow meter in the second disclosure, propagation of the sound waves in a measurement region, which is measured by ultrasonic waves, and the flow of the fluid to be measured are made uniform, so that more stable measurement can be performed.

In an ultrasonic flow meter in a third disclosure, particularly in the first disclosure, at least a tip of the one or more partition plates on the inlet side of the measurement flow path may have a curved surface.

With this configuration, in the ultrasonic flow meter in the third disclosure, the end portion of the partition plate is made thinner while a short shot generated at the tip of the one or more partition plates during molding is suppressed, and a shape that suppresses turbulence of the flow of the fluid to be measured is made, so that more stable measurement can be performed.

In an ultrasonic flow meter in a fourth disclosure, particularly in the second disclosure, at least a tip of the one or more partition plates on the inlet side of the measurement flow path may have a curved surface.

With this configuration, in the ultrasonic flow meter in the fourth disclosure, the end portion of the one or more partition plates is made thinner while a short shot generated at the tip of the one or more partition plates during molding is suppressed, and a shape that suppresses turbulence of the flow of the fluid to be measured is made, so that more stable measurement can be performed.

In an ultrasonic flow meter in a fifth disclosure, particularly in any one of the first to fourth disclosures, the portion having the maximum thickness of the one or more partition plates may be closer to the outlet side of the measurement flow path from a midpoint of a propagation path in the measurement flow path of the ultrasonic sensor.

With this configuration, the ultrasonic flow meter in the fifth disclosure suppresses the separation of the fluid in the region where the ultrasonic waves are measured in a case of a forward flow, so that more stable measurement can be performed.

In an ultrasonic flow meter in a sixth disclosure, particularly in any one of the first to fourth disclosures, the measurement flow path may have a gradient that matches the shape of the one or more partition plates, and shapes of the plurality of layered flow paths may be same.

Since the shape of each layered flow path is the same, a flow velocity ratio between the layered flow paths is uniform, so that more stable flow rate measurement can be performed.

In an ultrasonic flow meter in a seventh disclosure, particularly in the fifth disclosure, the measurement flow path may have a gradient that matches the shape of the one or more partition plates, and shapes of the plurality of layered flow paths may be same.

Since the shape of each layered flow path is the same, the flow velocity ratio between the layered flow paths is uniform, so that more stable flow rate measurement can be performed.

In an ultrasonic flow meter in an eighth disclosure, particularly in any one of the first to fourth disclosures, a sensor mounting portion that mounts the ultrasonic sensors may further be included, and the measurement flow path, the one or more partition plates, and the sensor mounting portion may be integrally molded.

With this configuration, material costs and assembly man-hours required for an ultrasonic sensor mounting block can be reduced.

In an ultrasonic flow meter in a ninth disclosure, particularly in the fifth disclosure, a sensor mounting portion that mounts the ultrasonic sensors may further be included, and the measurement flow path, the one or more partition plates, and the sensor mounting portion may be integrally molded.

With this configuration, material costs and assembly man-hours required for an ultrasonic sensor mounting block can be reduced.

In an ultrasonic flow meter in a tenth disclosure, particularly in the sixth disclosure, a sensor mounting portion that mounts the ultrasonic sensors may further be included, and the measurement flow path, the one or more partition plates, and the sensor mounting portion may be integrally molded.

With this configuration, material costs and assembly man-hours required for an ultrasonic sensor mounting block can be reduced.

In an ultrasonic flow meter in an eleventh disclosure, particularly in the seventh disclosure, a sensor mounting portion that mounts the ultrasonic sensors may further be included, and the measurement flow path, the one or more partition plates, and the sensor mounting portion may be integrally molded.

With this configuration, material costs and assembly man-hours required for an ultrasonic sensor mounting block can be reduced.

INDUSTRIAL APPLICABILITY

As described above, the ultrasonic flow meter in the present disclosure can improve the variation in measurement due to the thickness, which is caused by the turbulence of the flow of the fluid to be measured due to the separation of the fluid to be measured at the end portions of the one or more partition plates, while reducing the costs of components that have been incurred in the conventional case, and thus can also be applied to applications for a gas meter and the like.

REFERENCE MARKS IN THE DRAWINGS 1a, 1b ultrasonic sensor
2a, 2b mounting portion
3, 15 measurement flow path
3a, 3b, 3c, 15a, 15b, 15c layered flow path
6a, 6b opening
7 flow rate measuring unit
8, 13, 14 partition plate
8a, 13a portion having maximum thickness
9 measurement flow path inlet
10 measurement flow path outlet
11, 12 tip

The invention claimed is:

1. An ultrasonic flow meter comprising:
a measurement flow path where a cross section of the measurement flow path through which a fluid to be measured flows is rectangular;
one or more partition plates that divide the measurement flow path into a plurality of layered flow paths;
a pair of ultrasonic sensors that are disposed upstream and downstream on the layered flow paths and are capable of transmitting and receiving an ultrasonic signal; and
a flow rate measuring unit that detects a flow rate of the fluid to be measured based on a propagation time, the propagation time being a time period from when one of the ultrasonic sensors transmits the ultrasonic signal to cause the ultrasonic signal to propagate through the fluid to be measured until when an other one of the ultrasonic sensors receives the ultrasonic signal, wherein
the measurement flow path and the one or more partition plates are integrally molded, and the one or more partition plates have a thickness toward an inlet side and an outlet side that is thinner from a portion having a maximum thickness at a central part of the measurement flow path,
wherein the measurement flow path has a gradient that matches the shape of the one or more partition plates, and shapes of the plurality of layered flow paths are same.

2. The ultrasonic flow meter according to claim 1, wherein the portion having the maximum thickness has a surface parallel to a flow direction of the fluid to be measured and sound radiation directions of the ultrasonic sensors, and includes at least a part of a region where sound waves transmitted by the ultrasonic sensors propagate.

3. The ultrasonic flow meter according to claim 2, wherein at least a tip of the one or more partition plates on the inlet side of the measurement flow path have a curved surface.

4. The ultrasonic flow meter according to claim 3, wherein the portion having the maximum thickness of the one or more partition plates is closer to the outlet side of the measurement flow path from a midpoint of a propagation path in the measurement flow path of the ultrasonic sensor.

5. The ultrasonic flow meter according to claim 3, further comprising a sensor mounting portion that mounts the ultrasonic sensors,
wherein the measurement flow path, the one or more partition plates, and the sensor mounting portion are integrally molded.

6. The ultrasonic flow meter according to claim 2, wherein the portion having the maximum thickness of the one or more partition plates is closer to the outlet side of the measurement flow path from a midpoint of a propagation path in the measurement flow path of the ultrasonic sensor.

7. The ultrasonic flow meter according to claim 2, further comprising a sensor mounting portion that mounts the ultrasonic sensors,
wherein the measurement flow path, the one or more partition plates, and the sensor mounting portion are integrally molded.

8. The ultrasonic flow meter according to claim 1, wherein at least a tip of the one or more partition plates on the inlet side of the measurement flow path have a curved surface.

9. The ultrasonic flow meter according to claim 8, wherein the portion having the maximum thickness of the one or more partition plates is closer to the outlet side of the measurement flow path from a midpoint of a propagation path in the measurement flow path of the ultrasonic sensor.

10. The ultrasonic flow meter according to claim 8, further comprising a sensor mounting portion that mounts the ultrasonic sensors,
wherein the measurement flow path, the one or more partition plates, and the sensor mounting portion are integrally molded.

11. The ultrasonic flow meter according to claim 1, wherein the portion having the maximum thickness of the one or more partition plates is closer to the outlet side of the measurement flow path from a midpoint of a propagation path in the measurement flow path of the ultrasonic sensor.

12. The ultrasonic flow meter according to claim 11, further comprising a sensor mounting portion that mounts the ultrasonic sensors,
wherein the measurement flow path, the one or more partition plates, and the sensor mounting portion are integrally molded.

13. The ultrasonic flow meter according to claim 11, further comprising a sensor mounting portion that mounts the ultrasonic sensors, wherein
the measurement flow path, the one or more partition plates, and the sensor mounting portion are integrally molded.

14. The ultrasonic flow meter according to claim 1, further comprising a sensor mounting portion that mounts the ultrasonic sensors,
wherein the measurement flow path, the one or more partition plates, and the sensor mounting portion are integrally molded.

15. The ultrasonic flow meter according to claim 1, further comprising a sensor mounting portion that mounts the ultrasonic sensors, wherein
the measurement flow path, the one or more partition plates, and the sensor mounting portion are integrally molded.

* * * * *